United States Patent [19]

Dotson et al.

[11] Patent Number: 5,283,628

[45] Date of Patent: Feb. 1, 1994

[54] METHOD FOR MEASURING DIAMETERS OF NON-CIRCULAR FIBERS

[75] Inventors: Jerald B. Dotson, Los Angeles, Calif.; Jerry D. Nease, Wilmington, N.C.; Bruce W. Reding, Elmira, N.Y.

[73] Assignee: Corning Incorporated, Corning, N.Y.

[21] Appl. No.: 816,491

[22] Filed: Dec. 31, 1991

[51] Int. Cl.⁵ .............................................. G01B 9/02
[52] U.S. Cl. .................................... 356/355; 356/73.1; 356/357; 356/384
[58] Field of Search ...................... 356/355, 357, 73.1, 356/239, 384, 385, 386, 387

[56] References Cited

U.S. PATENT DOCUMENTS

| | | | |
|---|---|---|---|
| 3,982,816 | 9/1976 | Watkins | 356/357 |
| 4,027,977 | 6/1977 | Frazee, Jr. | 356/239 |
| 4,046,536 | 9/1977 | Smithgall . | |
| 4,067,651 | 1/1978 | Watkins | 356/357 |
| 4,136,961 | 1/1979 | Young | 356/239 |
| 4,176,961 | 12/1979 | Frazee et al. | 356/355 |
| 4,280,827 | 7/1981 | Murphy et al. | 356/73.1 |
| 4,307,296 | 12/1981 | Presby . | |
| 4,363,827 | 12/1982 | Eichenbaum . | |
| 4,501,492 | 2/1985 | Douklias . | |
| 4,541,856 | 9/1985 | Maillard et al. . | |
| 4,847,509 | 7/1989 | Millet et al. . | |
| 4,924,087 | 5/1990 | Bailey et al. . | |
| 5,185,636 | 2/1993 | Botton et al. | 356/239 |

FOREIGN PATENT DOCUMENTS 0069355 1/1983 European Pat. Off. .
0218151 4/1987 European Pat. Off. .

OTHER PUBLICATIONS

"Measurement of Optical Fiber Diameter Using the Fast Fourier Transform", Mustafa A.G. Abushagur and Nicholas George, *Applied Optics*, Jun. 15, 1980, vol. 19, No. 12, pp. 2031–2033.

"Outer Diameter Measurement of Low Birefringence Optical Fibers by a New Resonant Backscatter Technique", A. Ashkin, J. M. Dziedzic and R. H. Stolen, *Applied Optics*, Jul. 1, 1981, vol. 20, No. 13, pp. 2299–2303.

*Primary Examiner*—Samuel A. Turner
*Attorney, Agent, or Firm*—K. Mcneill Taylor, Jr.

[57] ABSTRACT

A method for measuring the diameter of a transparent filament is provided which is substantially insensitive to ellipticity of the filament. The method comprises using an interference technique to measure the filament diameter at two locations which are spaced apart by an amount such that a plot of diameter versus angle of rotation for an elliptical filament calculated at the first location is approximately 90° out of phase from the same plot calculated at the second location. Due to the phase difference, the average of the two measurements is substantially insensitive to ellipticity. For measurement apparatus comprising one laser and two detectors and for optical waveguide fibers having a cladding composed of fused silica, the two locations can be about 123° apart. In other embodiments, a method for characterizing the non-circularity of a filament is provided. Apparatus for practicing the foregoing methods is also disclosed.

24 Claims, 6 Drawing Sheets

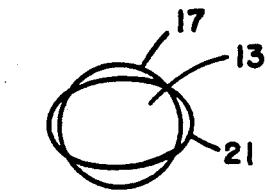
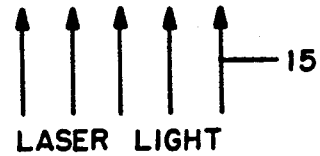
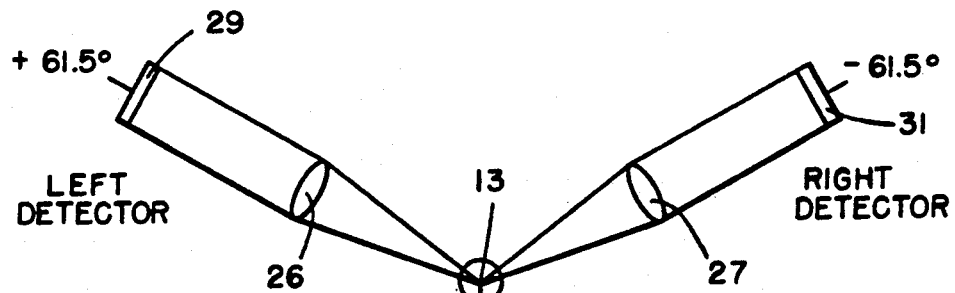
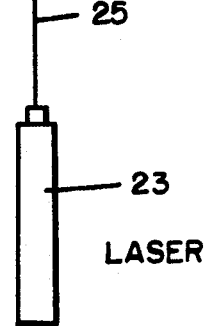

METHOD FOR MEASURING DIAMETERS OF NON-CIRCULAR FIBERS

BACKGROUND OF THE INVENTION

1. Field of the Invention

This invention relates to methods and apparatus for measuring the diameter of optical waveguide fibers. More particularly, the invention relates to 1) a technique for measuring fiber diameter which is insensitive to fiber ellipticity and 2) a technique for characterizing the extent to which a fibers cross-section is non-circular.

2. Description of the Prior Art

The precise measurement of the outside diameter of optical waveguide fibers is of central importance in both the manufacturing and quality control of such fibers. Among other things, diameter measurements are used to control the fiber drawing process and to select fiber suitable for commercial use.

U.S. Pat. Nos. 3,982,816 and 4,067,651 to Lawrence Watkins disclose an optical technique for measuring fiber diameter which is widely used in the industry. The basic components of the Watkins system are schematically illustrated in FIG. 1. As shown therein, optical waveguide fiber 13, whose cross-section has been greatly expanded for purposes of illustration, is transversely illuminated by light 15 of sufficient spatial coherence and monochromaticity to create a discernible interference pattern in the far field, that interference pattern being created by the superposition of light reflected from the fiber surface 17 and light refracted through the fiber body 13. In practice, a laser, e.g., a HeNe laser, is the preferred light source because of its wavelength stability. The following discussion is thus in terms of a laser light source, it being understood that other light sources having sufficient spatial coherence and monochromaticity can be used if desired.

As explained in the Watkins patents, in the far field, this reflected and refracted light interferes to form fringe pattern 19. For an optical waveguide fiber having a core and a cladding, the fringe pattern will in general be a function of the wavelength of the incident light and the indices of refraction and the diameters of both the core and the cladding. However, as shown by Watkins, if the core/clad ratio is not too large and if the fringe pattern is examined at sufficiently large angles, e.g., above about ±50° in FIG. 1 for core/clad ratios of less than about 0.5, the pattern will depend almost exclusively on the diameter and index of refraction of the cladding.

Accordingly, if the index of refraction (n) of the cladding is known, the outside diameter (d) of the fiber can be determined by analyzing the fringe pattern. Specifically, the diameter can be approximated with good precision by counting the number of full and partial fringes (N) between two angles ($\theta_a$ and $\theta_b$) and then using the following equations to calculate d:

$$E(\theta_a) = \sin(\theta_a/2) + [n^2 + 1 - 2n\cos(\theta_a/2)]^{\frac{1}{2}} \quad (1)$$

$$E(\theta_b) = \sin(\theta_b/2) + [n^2 + 1 - 2n\cos(\theta_b/2)]^{\frac{1}{2}} \quad (2)$$

$$d = N\lambda/[E(\theta_b) - E(\theta_a)] \quad (3)$$

where $\lambda$ is the wavelength of the laser light used to illuminate the fiber. Note that in equation 3 there is a direct relationship between diameter and fringe count. In practice, given an invariant clad index and an invariant wavelength, one can calibrate the system with an empirical constant, which when multiplied by the number of fringes, gives the diameter.

Refinements of the basic Watkins technique can be found in various patents and publications including Frazee, Jr. et al. U.S. Pat. No. 4,027,977 (determination of core/clad ratio by detecting the angle of maximum modulation of the fringe pattern); Murphy et al. U.S. Pat. No. 4,280,827 (use of delay circuits and comparators to analyze fringe patterns); Smithgall, Sr. U.S. Pat. No. 4,046,536 (analysis of fringe counts in the presence of "dropouts" resulting from faults in the fiber); and Mustafa Abushagur and Nicholas George, "Measurement of Optical Fiber Diameter Using the Fast Fourier Transform," *Applied Optics*, Jun. 15, 1980, vol. 19, no. 12, 2031-2033 (use of fast Fourier transforms to analyze fringe patterns).

Other optical techniques for measuring fiber properties, including fiber diameters, can be found in Bailey et al. U.S. Pat. No. 4,924,087 (detection of fiber defects using light scattered out of the plane of the basic diffraction pattern); Douklias U.S. Pat. No. 4,501,492 (detection of fiber defects and testing of fiber diameters using a spatial filter prepared using diffracted/scattered light from a defect-free fiber); Eichenbaum U.S. Pat. No. 4,363,827 (detection of "caustic" surfaces in the pattern of scattered light produced by a coated optical fiber in order to control the coating process); Maillard et al. U.S. Pat. No. 4,541,856 (use of "diffused" light to detect bubbles, blisters, and solid particles in a stream of molten glass); Millet et al. U.S. Pat. No. 4,847,509 (use of two perpendicular optical systems to measure fiber diameter in which each system forms a blurred image of the fiber on a strip of photodetectors); Preshy U.S. Pat. No. 4,307,296 (measurement of core diameter by inducing fluorescence of an index-modifying dopant in the core); Young, II U.S. Pat. No. 4,136,961 (detection of defects in glass blanks by rotating the blank through a thin beam of light); and A. Ashkin, J. M. Dziedzic, and R. H. Stolen, "Outer Diameter Measurement of Low Birefringence Optical Fibers by a New Resonant Backscatter Technique," *Applied Optics*, Jul. 1, 1981, vol. 20, no. 13, 2299-2303 (use of near-field resonant backscattered light to determine fiber diameters and ellipticity).

Equations 1-3 are based on the assumption that the fiber is circular. In practice, fibers are not perfectly round but tend to have at least some ovoid or elliptical characteristics. This non-circularity can cause over or under estimates of the average fiber diameter by as much as one percent. These errors in diameter measurement limit the level of process control and product uniformity which can be achieved. In particular, one needs to hold the average fiber diameter at a particular value during the drawing of optical waveguide fibers from preforms. Errors of one percent in the diameter of optical waveguide fibers are considered to be large errors relative to the level of uniformity expected for such fibers.

Accordingly, there is need for a fiber diameter measurement technique which is insensitive to ellipticity, i.e., a technique which will determine the average diameter of a non-circular fiber with high precision. Moreover, there is also a need for a method which can characterize the ellipticity of a fiber so that manufacturing techniques, such as fiber draw, can be modified and/or controlled to minimize non-circularity.

The Watkins patents include a proposed technique for measuring the degree of a fiber's non-circularity.

According to Watkins, non-circularity results in a spatial shift of the interference fringe patterns, with the pattern for angles greater than 0° moving, for example, closer to 0°, and the pattern for angles less than 0° moving away from 0°.

The Watkins patents propose using these shifts to ascertain the non-circularity of fibers by comparison of measured shifts with those for calibrated fibers. See column 9, line 66, to column 10, line 21, of U.S. Pat. No. 3,982,816 and column 9, lines 35-58, of U.S. Pat. No. 4,067,651. Watkins also describes performing fringe counts on each side of the fiber, and in claim 7 of U.S. Pat. No. 4,067,651, Watkins claims such a process wherein the difference between the fringe counts is determined and compared with fringe count differences for calibrated fibers.

Significantly, although Watkins discusses the problem of elliptical fibers, he does not provide a method for measuring fiber diameter which is insensitive to ellipticity. As to his proposed technique for estimating the degree of non-circularity, that technique suffers from a number of problems. First, it requires calibration with fibers of known ellipticity, presumably having a wide range of major to minor axis ratios. Such fibers would in general be difficult to produce, and the subsequent calibration of the system using a series of such fibers would clearly be tedious and time consuming.

Second, in accordance with the present invention, it has been determined that the detection of fiber ellipticity is subject to "blind spots" depending on the orientation of the fiber relative to the light source (see, for example, the 0°, 90°, and 180° points in FIG. 6). Watkins does not in any sense address this problem.

Third, in accordance with the present invention, it has been determined that the fringe pattern produced by a non-circular fiber is a function of the orientation of the fiber's major and minor axes with respect to the direction of the light source (see, for example, FIG. 3). Accordingly, for a meaningful comparison to be made in the Watkins system between an unknown fiber and a calibration fiber, both fibers would have to have the same orientation with respect to the laser beam. Plainly, this would be difficult to do for stationary fibers. For a moving fiber, such as a fiber being drawn from a preform, the orientation of the fiber's non-circularity is generally unknown, thus making the Watkins system unworkable.

SUMMARY OF THE INVENTION

In view of the foregoing state of the art, it is an object of this invention to provide methods and apparatus for measuring the average diameter of an optical waveguide fiber or, more generally, any transparent filament, which methods and apparatus are substantially insensitive to fiber non-circularity and, in particular, are substantially insensitive to fiber ellipticity. It is also an object of the invention to provide such methods and apparatus which are simple and inexpensive to implement in practice.

It is a further object of the invention to provide methods and apparatus for characterizing the extent to which the cross-section of a fiber (filament) is non-circular and, in particular, is elliptical. Again, it is an object of the invention to provide such methods and apparatus which are simple and inexpensive to implement in practice.

To achieve the foregoing and other objects, the invention in accordance with certain of its aspects provides a method and associated apparatus for measuring the diameter of an optical waveguide fiber comprising the steps of:

(a) directing a beam of coherent, monochromatic radiation, e.g., a laser beam, at the fiber so as to produce a far-field (Watkins-type) interference pattern;

(b) using the interference pattern to determine two values for the fiber diameter at two spaced-apart locations, the locations being chosen so that a plot of diameter versus angle of rotation for an elliptical fiber determined for one of the locations is approximately 90° out of phase from the same plot determined at the other location; and (c) averaging the two values to produce a value for the fiber's diameter which is substantially insensitive to ellipticity of the fiber.

For a fiber having a cladding of fused silica, an angular spacing between the two measurement locations in the range of from about 120° to about 124°, e.g., a spacing of about 123°, has been found to produce the desired phase difference between the two diameter measurements.

The diameter value determined in step (c) is not only ellipticity-insensitive, it is also an excellent approximation of the average diameter of an elliptical fiber so long as the ratio of the minor to the major axis of the fiber is 0.98 or greater. Such a range covers the types of optical waveguide fibers encountered in practice. Below this range, simply averaging the two values tends to produce an overestimate of the average diameter because there are more short radii as the eccentricity of an ellipse increases.

In accordance with other aspects of the invention, a method and associated apparatus for characterizing the non-circularity of a fiber is provided comprising the steps of:

(a) directing at least one beam of coherent, monochromatic radiation at the fiber to produce at least one far-field interference pattern;

(b) using the interference pattern(s) to determine at least three values for the fiber diameter, one value for each of at least three spaced-apart locations; and (c) comparing the at least three values of the fiber diameter to produce an index indicative of the non-circularity of the fiber, e.g., determining an index equal to the difference between the largest diameter value and the smallest diameter value divided by the average diameter value.

In certain preferred embodiments of these aspects of the invention, two of the systems used to determine average diameter, i.e., a laser and two angularly-separated detectors, are stacked on top of one another with one system shifted by 45I relative to the other system. Diameter values are obtained for each of the four detectors and are compared to determine the index of non-circularity.

The accompanying drawings, which are incorporated in and constitute part of the specification, illustrate the preferred embodiments of the invention, and together with the description, serve to explain the principles of the invention. It is to be understood, of course, that both the drawings and the description are explanatory only and are not restrictive of the invention.

BRIEF DESCRIPTION OF THE DRAWINGS

FIG. 1 is a schematic diagram illustrating the elements of a prior art, Watkins-type system for measuring fiber diameter using far-field interference patterns.

FIG. 2 is a schematic diagram illustrating the components of a fiber diameter measurement system constructed in accordance with the present invention.

DESCRIPTION OF THE PREFERRED EMBODIMENTS

Figure 3A:
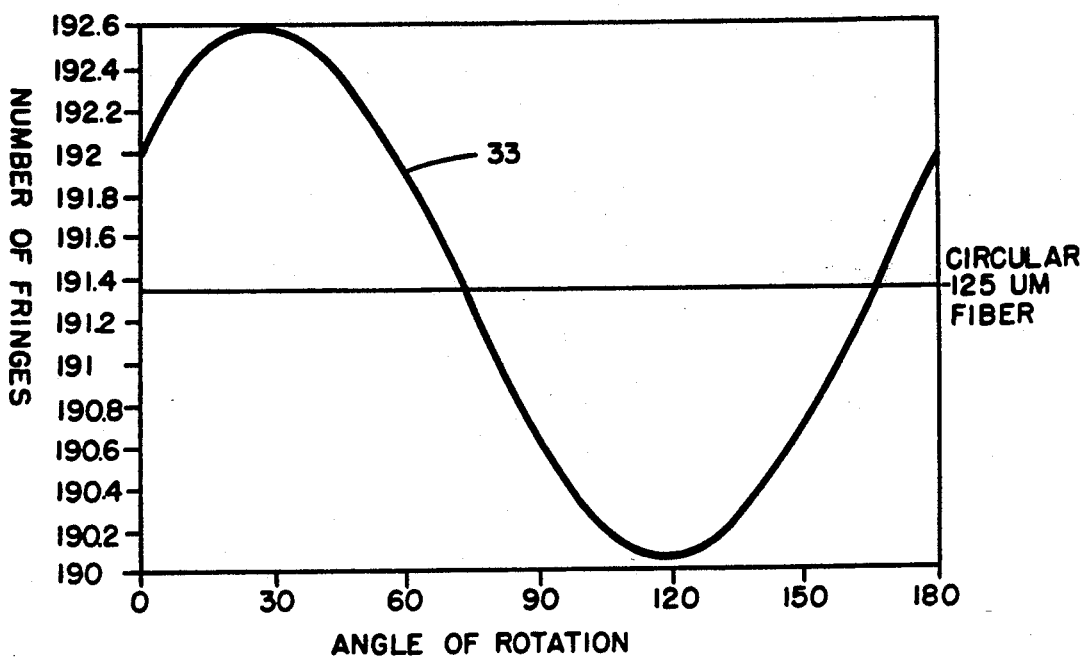
FIGS. 3a and 3b are graphs of calculated fringe count versus angle of rotation of an elliptical fiber for an eighty degree detector centered at +46° for FIG. 3a and −46° for FIG. 3b.

With reference now to the figures, FIG. 2 shows a system for measuring fiber diameter constructed in accordance with the invention. As illustrated therein, laser 23 produces a beam 25 of collimated, coherent, monochromatic light. Beam 25 defines a 0° or central axis for the system.

Light from beam 25 is reflected and refracted by fiber 13 so as to produce a far-field interference pattern according to equations 1-3.

Optical systems 26,27 project the far-field interference pattern onto left and right detectors 29,31. The detectors can comprise linear arrays of photodetectors whose output, after analog to digital conversion, consists of a digital representation of the fringe pattern. A discussion of optical systems 26,27 and their relationship to detectors 29,31 can be found in U.S. patent application Ser. No. 816,882, entitled "Measurement of Fiber Diameters With High Precision" which is being filed concurrently herewith and which is commonly assigned with this application. The relevant portions of this application are incorporated herein by reference.

As shown in FIG. 2, the center of detector 29 lies at +61.5° and the center of detector 31 lies at −61.5°. The derivation of these values is discussed in detail below. A suitable angular collection range for each detector is 20°, i.e., from +51.5° to +71.5° for detector 29 and from −51.5° to −71.5° for detector 31. Detectors having other angular collection ranges can, of course, be used if desired. For example, in practice, a detector having an angular collection range of 16° has been found to work successfully.

The output of each detector is analyzed separately to produce a signal representative of the diameter of the fiber. The analysis can comprise counting the fringes and partial fringes in the 20° detection interval as described in, among other places, the Watkins patents. Preferably, the analysis is performed using the spatial frequency analysis techniques described in the abovereferenced, copending application entitled "Measurement of Fiber Diameters With High Precision."

Once the two signals representative of the fiber diameter have been generated, they are simply averaged (i.e., added together and divided by two) to produce the desired final signal which is representative of the fiber diameter and which is substantially insensitive to fiber ellipticity.

It should be noted that neither the intermediate signals obtained from the output of the two detectors nor the final signal need actually be a diameter value in, for example, microns. Rather, those signals can be fringe counts, or a characteristic spatial frequency of the fringe pattern, or some other quantity which is representative of the diameter of the fiber. This is especially the case where the fiber diameter measurement is to be used as part of process control where actual diameter values are unnecessary. Although the signals need not be diameter measurements, each signal needs to be separately calibrated so as to avoid biasing of the average. In particular, for a cylindrical fiber, the two signals should be essentially equal.

The process and underlying theory for determining the location of the detectors is illustrated in FIGS. 3-7. The curves in these figures are plots of calculated fringe counts versus angle of rotation for an elliptical fiber rotated through 180°. The geometry used is that of FIG. 1 where the fiber has the elliptical surface shown schematically at 21. The fiber is assumed to rotate counterclockwise and 0° of rotation corresponds to the fiber's minor axis being parallel to the system's central (laser) axis.

For purposes of calculation, the fiber's core and cladding were assumed to have indices of refraction of 1.469 and 1.457, respectively. The core diameter was assumed to be 8.0 microns, and the major and minor diameters of the cladding were 126.0 microns and 124.0 microns, respectively. These dimensions and refractive indices are typical of those that would be found in the application of the invention to the control of the drawing process for a single mode optical waveguide fiber. For other types of transparent filaments, similar calculations are performed using parameters appropriate to the filament whose diameter is to be measured.

The calculations were performed by ray tracing in which phase was tracked for the various rays so that the interference effects in the far field could be seen. The calculations also kept track of the power associated with the various rays, including multiply reflected rays, so as to produce a realistic far field pattern. To keep the calculations manageable, rays representing very small amounts of power were ignored. In general, at least 99% of the incident power was accounted for. The accuracy of the ray tracing technique was confirmed by comparison with solutions of the scalar wave equations for the far field for cylindrical fibers.

Figure 3B:
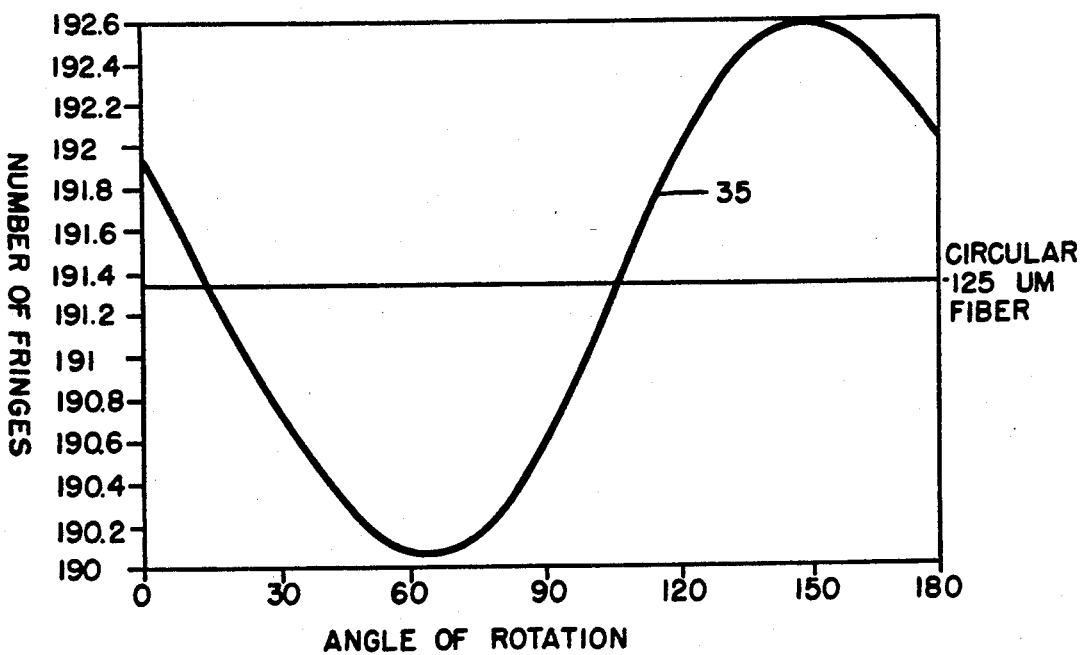

The curves in FIG. 3 were calculated for two 80° detectors centered at +46° and −46° for FIGS. 3a and 3b, respectively. Curves 37 and 39 in FIGS. 5–6 were calculated for two 20° detectors centered at +60° and −60°, respectively. Curves 43 and 45 in FIG. 7 were calculated for a 20° detector centered at +60° and +70°, respectively.

An examination of FIG. 1 reveals a number of basic properties of the curves of FIGS. 3–7. First, because of the symmetry of elliptical surface 21, the period of these curves is 180°. Second, for detectors which are symmetrically located relative to the system's axis, i.e., $\theta 1 = -\theta 2$, the fringe counts at the two detectors ($N_{\theta 1}$ and $N_{\theta 2}$) satisfy the following relationship:

$$N_{\theta 1}(\omega) = N_{\theta 2}(-\omega) \quad (4)$$

where $\omega$ is the angle of rotation of the elliptical fiber.

Each of the fringe count curves shown in FIGS. 3–7 can be approximated by the sum of a constant value plus a sinusoidal ripple, i.e., by an equation of the following form:

$$N_\theta(\omega) = K(\theta) + A(\theta)[\sin 2(\omega + \phi)] \quad (5)$$

where $K(\theta)$ is the constant value and $A(\theta)$ and $\phi(\theta)$ are the amplitude and phase of the ripple, all of which, in the general case, depend upon the detector angle $\theta$.

An examination of FIG. 3 reveals that for these curves, $K(\theta)$ is approximately 191.35 fringes, $A(\theta)$ is approximately 1.25 fringes, and $\phi(\theta)$ is approximately 15° for FIG. 3a and approximately 75° for FIG. 3b.

In accordance with the invention, two detector locations ($\theta 1$ and $\theta 2$) are chosen such that the average of the diameters measured at the locations is insensitive to the ellipticity of the fiber, i.e., $$[N_{\theta 1}(\omega) + N_{\theta 2}(\omega)]/2 = N_{av} \quad (6)$$

for all $\omega$.

Considering first the case of two detectors located on opposite sides of the system's central axis and equally angularly spaced from that axis, i.e., el $\theta 1 = -\theta 2$, we have from symmetry:

$$K(\theta 1) = K(\theta 2) \quad (7)$$

$$A(\theta 1) = A(\theta 2) \quad (8)$$

Accordingly, for equation 6 to be satisfied for curves having the form of equation 5, the following relationship must be satisfied for all $\omega$:

$$\sin 2(\omega + \phi(\theta 1)) = -\sin 2(\omega + \phi(\theta 2)) \quad (9)$$

This in turn means that $\phi(\theta 1)$ and $\phi(\theta 2)$ must satisfy the following relationship:

$$\phi(\theta 1) - \phi(\theta 2) = (2m-1)\pi/2, m=1,2,\ldots \quad (10)$$

Or, in graphical terms, the fringe count curves for the first and second detector locations must be 90° out of phase.

Figure 4:
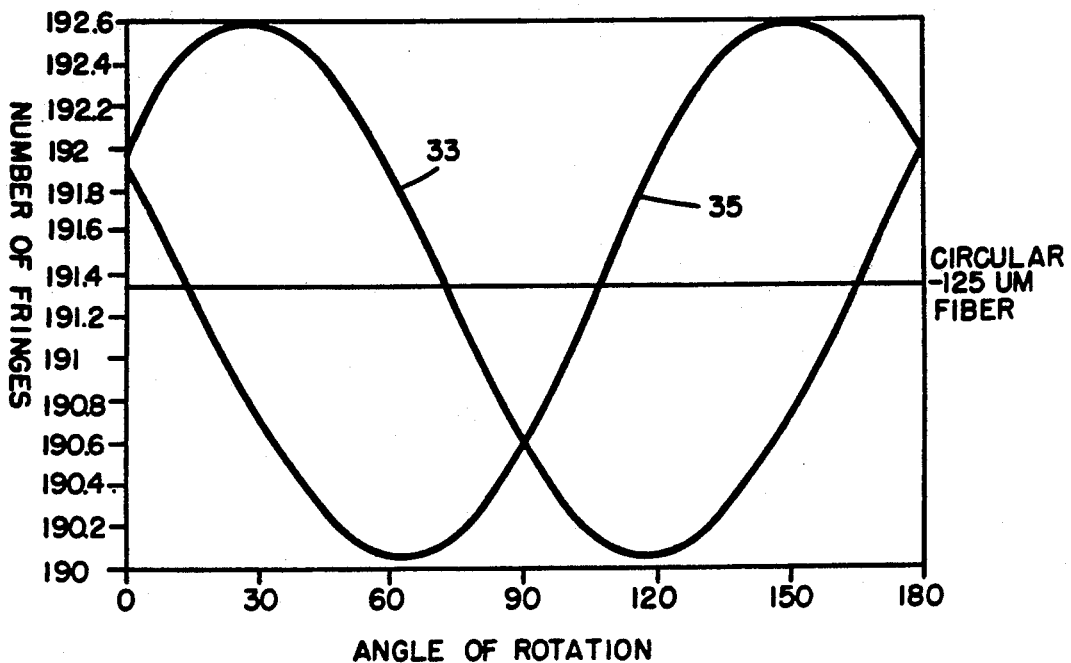
FIG. 4 shows the superposition of the curves of FIGS. 3a and 3b.

As shown in FIG. 4, the fringe count curves of FIGS. 3a and 3b, which correspond to detector locations of ±46°, i.e., roughly perpendicular, do not satisfy equation 9. The phase difference for these two curves is approximately 60°, rather than the desired 90°. Accordingly, the average of diameter measurements for these two detector locations is not insensitive to ellipticity as is desired.

Figure 6:
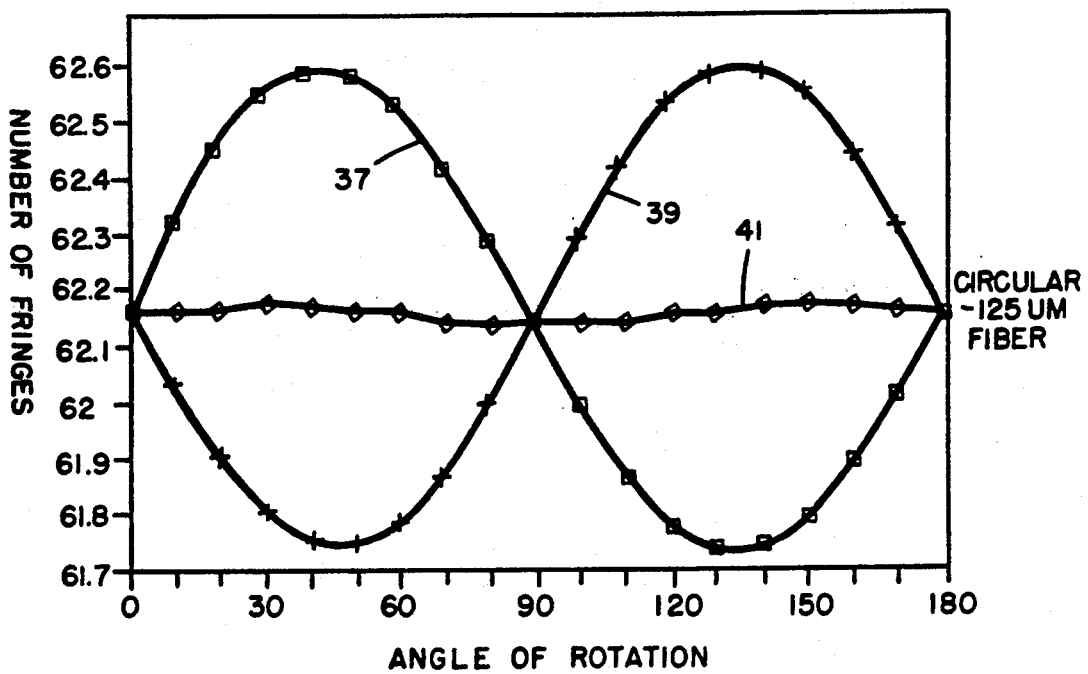
FIG. 6 shows the superposition of the curves of FIGS. 5a and 5b and the average of those two curves (curve 41).
Figure 5A:
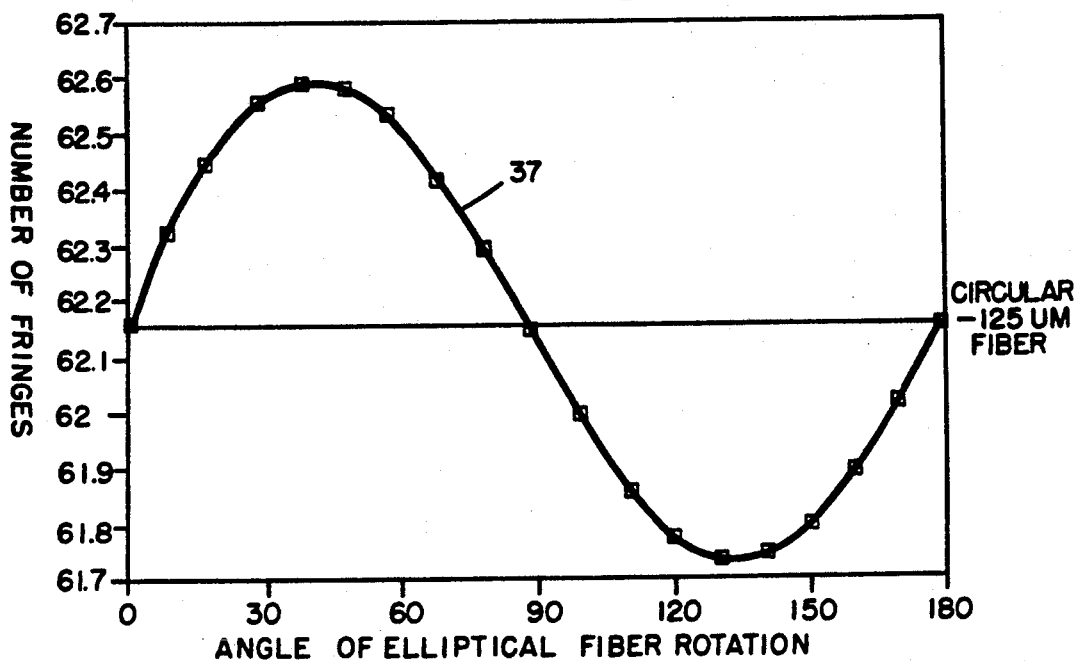
FIGS. 5a and 5b are graphs of calculated fringe counts versus angle of rotation of an elliptical fiber for a twenty degree detector centered at +60° for FIG. 5a and at −60° for FIG. 5b.
Figure 5B:
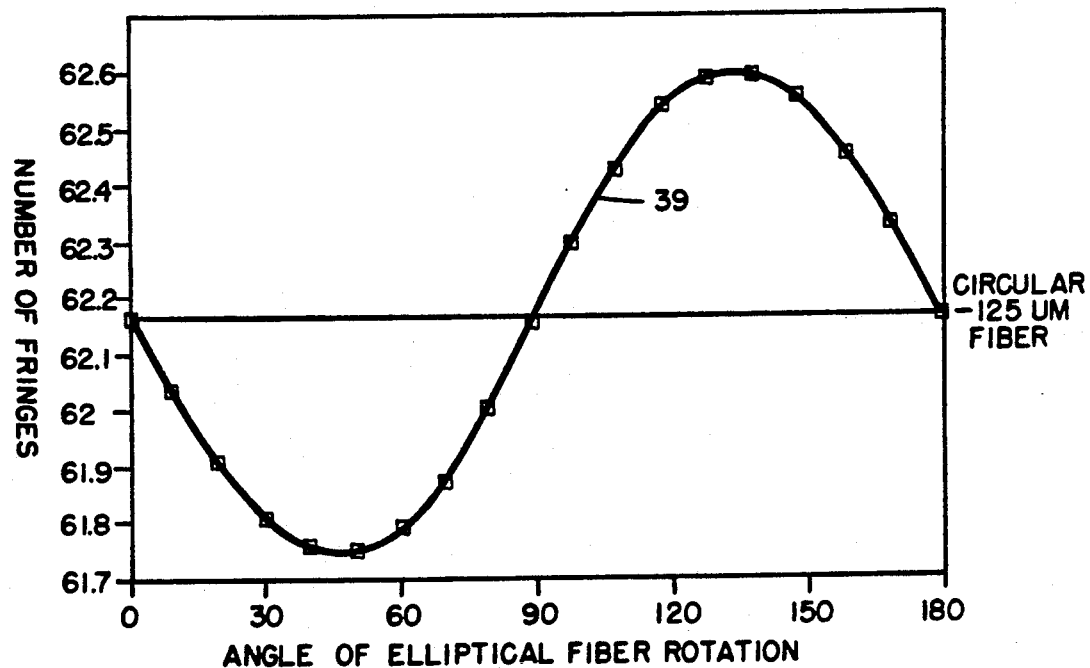

However, as illustrated in FIGS. 5(a) and 5(b), moving the detectors farther apart to approximately ±60° does achieve the desired phase difference of approximately 90°. As shown in FIG. 6, the average of the fringe counts for these two locations, i.e., curve 41 in FIG. 6, is substantially independent of the angle of rotation of the fiber.

Figure 8:
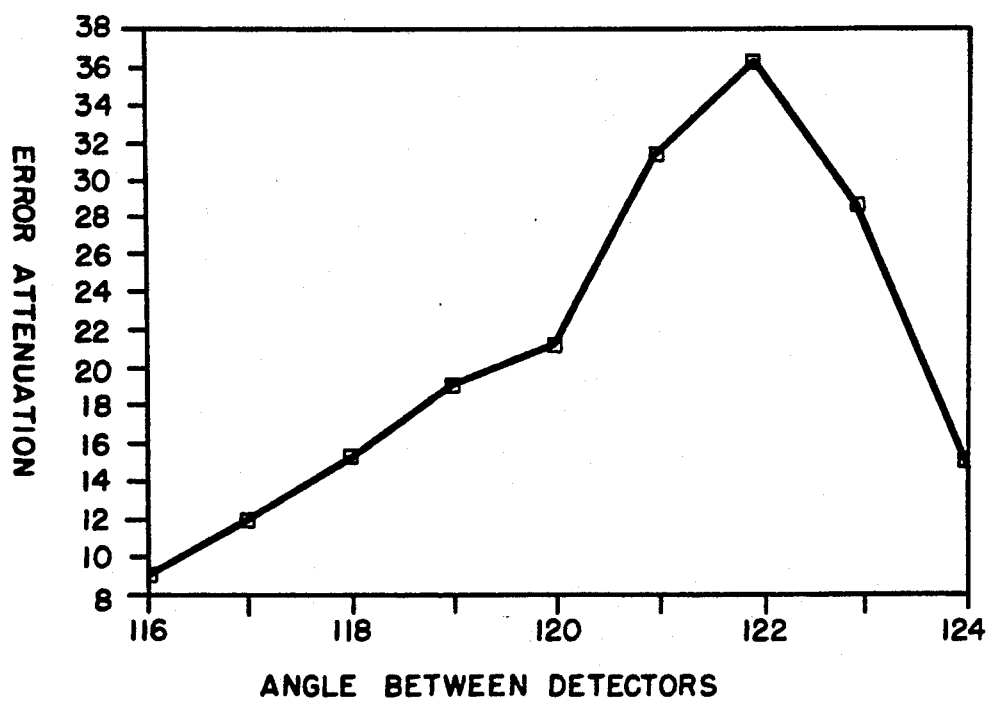
FIG. 8 is a graph of error attenuation versus angle between detectors obtained from a series of calculations of the type plotted in FIG. 6 for included angles between the left and right detectors of FIG. 2 of between 116° and 124°.

Even further insensitivity to ellipticity can be achieved by following the procedure illustrated in FIG. 8. The vertical axis (error attenuation axis) in this figure is a plot of the ratio of the peak-to-peak amplitude of the fringe count curve for a single detector, e.g., curve 37 or 39 in FIG. 6, to the peak-to-peak amplitude of the two-detector average curve, e.g., curve 41 in FIG. 6. The horizontal axis is the angular spacing between the detectors. As shown in this figure, the greatest error attenuations, i.e., error attenuations of at least 20 to 1, occur in the range between about 120° and about 124°, with the maximum occurring at about 122°. It should be noted that, because of the complex nature of the fringe pattern, complete insensitivity to ellipticity, which would correspond to an infinite error attenuation value, is not achieved even for the calculated optimum detector spacing. However, a 20 to 1 reduction is adequate for practical applications.

The fringe count curves, and thus the error attenuation curve of FIG. 8, depend upon the index of refraction of the cladding. In general, the detector spacing which achieves the maximum error attenuation is a weakly increasing function of the index of refraction. However, for index changes of less than 0.05 the optimum detector spacing is not significantly changed. Accordingly, a wide variety of fiber types under a wide range of temperatures can be measured with a high degree of ellipticity attenuation using the same detector spacing.

In practice, a spacing of 123° ($\theta = \pm 61.5°$) has been found to work successfully in the measurement of a variety of single-mode and multi-mode optical waveguide fibers over a wide range of temperatures.

The curves of FIGS. 3–8 have been calculated for a fiber having a purely elliptical shape. In practice, a fiber's deviation from circularity may include components other than those represented by an ellipse. Accordingly, some residual sensitivity to non-circularity can be expected even for a detector spacing corresponding to the maximum calculated error attenuation value.

In practice, it has been found that the main component of the out-of-roundness of optical waveguide fibers is elliptical for out-of-roundnesses greater than about 0.2 microns. Accordingly, the technique of the present invention affords excellent error attenuation for such fibers. Fibers having lower levels of out-of-roundness tend to be less elliptical in shape, therefore diminishing to some extent the error attenuation achieved by the invention. However, the difference between the minimum and maximum diameters for such fibers is so small that the somewhat diminished error attenuation is inconsequential.

The desired insensitivity to ellipticity can also be achieved for non-symmetric arrangements of the detectors. In general, the phase of the fringe count curve increases approximately linearly with $\theta$, i.e., the phase increases approximately 1° for each 1° increase in the magnitude of $\theta$. This effect is illustrated in FIG. 7 where curves 43 and 45 have been calculated for detector center angles of 60° and 70°, respectively.

From symmetry, similar, but opposite, changes occur for a detector located around −60°, i.e., the phase decreases approximately 1° for each 1° decrease in the magnitude of $\theta$. Accordingly, the desired 90° phase difference can be maintained by making equal, but opposite, changes in the locations of the left and right detectors, e.g., by moving the left detector from 60° to 70° while moving the right detector from −60° to 50°. Put another way, the desired 90° phase difference can be maintained by holding the spacing between the detectors at about 120°.

Although the non-symmetric configuration can be used, the symmetric configuration is preferred for a number of reasons. First, to maintain the spacing of about 120°, one of the detectors must move closer to the system's central axis. As a result, the effects of the core will be greater for this detector than for the detector farther from the axis.

Figure 7:
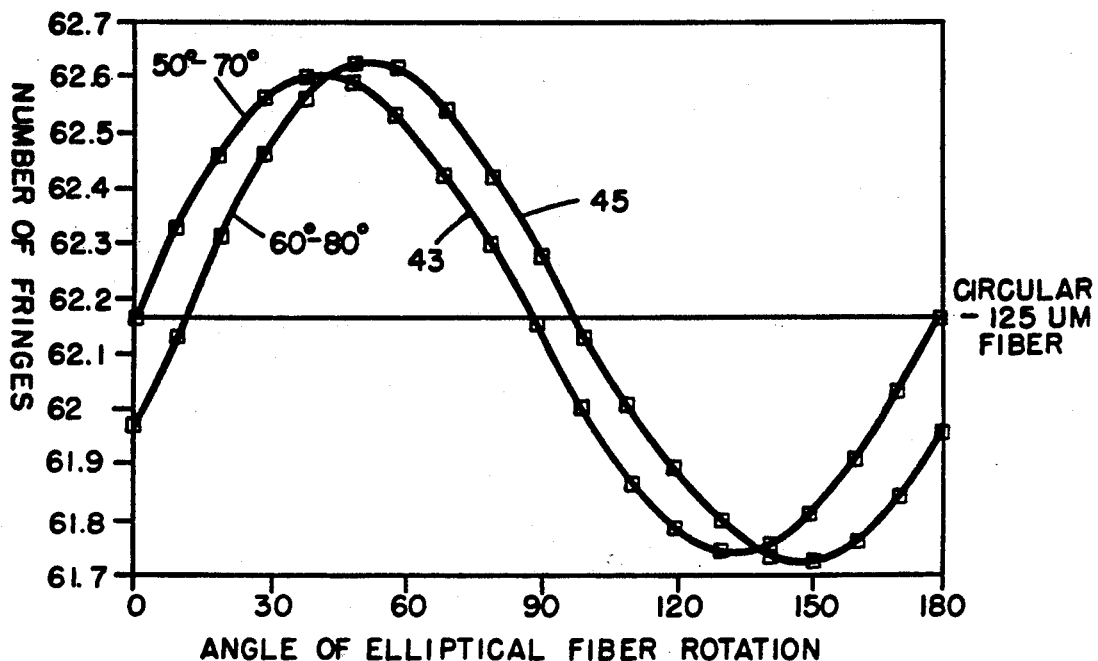
FIG. 7 is a graph of calculated fringe counts versus angle of rotation of an elliptical fiber for a twenty degree detector centered at +60° for curve 43 and at +70° for curve 45.

Also, as shown in FIG. 7, the $K(\theta)$ and $A(\theta)$ values in equation 5 change with detector angle. To maintain the maximum level of ellipticity insensitivity, this effect should be removed from the data to avoid biasing of the average of the diameter measurements for the two detectors, i.e., the detectors should be calibrated at their respective locations to give substantially equal signals for a cylindrical fiber.

Although it is preferred to perform the ellipticity-insensitive diameter measurement using one laser and two coplanar detectors, as described above, it should be noted that such measurements can also be performed using two lasers and two detectors.

In particular, two separate but identical laser-detector assemblies, each comprising one laser and one detector, can be stacked on top of one another so that the interference pattern produced by the first laser does not mix with the interference pattern produced by the second laser.

The assemblies can be stacked coaxially, with the separation of the two interference patterns being accomplished by a slight longitudinal displacement of the two assemblies. Alternatively, the two systems can be stacked so that both measure the same longitudinal position of the fiber, with the separation of the two fringe patterns being accomplished by a slight relative angling of the two laser beams as viewed in a direction perpendicular to the fiber.

The coaxial stacking scheme is more straightforward, but can induce errors if the geometry of the fiber is not identical at the two longitudinal locations. The laser angling scheme removes the above concern, but adds complexity to the manufacture and alignment of the apparatus. In practice, coaxial stacking has been used with a longitudinal separation of the two assemblies of about one millimeter. Over such a short distance, fiber geometry changes are generally insignificant, especially as measured on a moving fiber during fiber draw.

Whichever approach is used, i.e., coaxial stacking or laser angling, by orienting the two identical laser-detector assemblies at 90° to each other, the necessary 90° phase shift in the fringe count vs. fiber angle curve is achieved. It should be noted that ellipticity insensitivity is not contingent upon having an approximately 60° angle between laser and detector in each laser-detector assembly. In fact, so long as the two assemblies are identical, the detectors can be placed at any angle relative to their associated lasers where the fringe pattern is representative of diameter. (See the Watkins patents.)

More generally, the two laser-detector assemblies do not have to be identical, so long as they are azimuthally oriented such that their resultant fringe count vs. fiber orientation curves are 90° out of phase.

In either the identical or nonidentical cases, the average of the diameter measurements are substantially independent of fiber ellipticity, as with the coplanar configuration of FIG. 2. The need for an extra laser, however, makes these approaches more expensive to implement in practice than the one laser/two detector approach.

In addition to being able to determine the average diameter of a non-circular fiber, it is also important to be able to characterize the extent to which the fiber is non-circular. With reference to FIG. 6, it can be seen that the difference between curves 37 and 39 at their peak values, i.e., around 45 and 135 degrees, provides a good measure of non-circularity. Unfortunately, at other angles the difference is less meaningful and at 0, 90, and 180 degrees, the difference drops to zero and thus erroneously indicates that the fiber is circular. In practice, of course, the orientation of the fiber with respect to the detectors is in general unknown.

Figure 9:
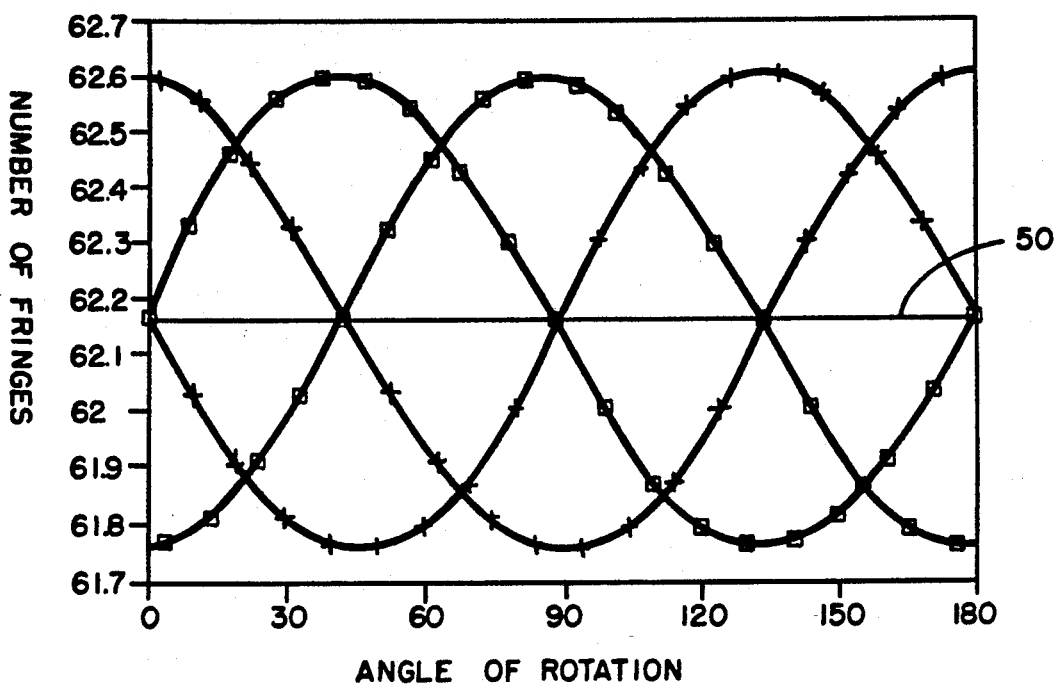
FIG. 9 is a graph of simulated fringe counts versus angle of rotation of an elliptical fiber for two systems of the type shown in FIG. 2 wherein one system is shifted by 45° with respect to the other system.

FIG. 9 illustrates a solution to this problem wherein four detectors, rather than two detectors, are used to measure the diameter of the fiber. Preferably, the four detectors are composed of two systems of the type shown in FIG. 2 placed on top of one another, with the central axis of the second system shifted by 45° relative to the central axis of the first system. This shift causes fringe count curves for the second system to be shifted by 45° relative to the fringe count curves for the first system, thus filling in the gaps between the curves as shown in FIG. 9.

Various indices indicative of the non-circularity of the fiber can be determined from the diameter measurements obtained from the four detectors. For example, an index equal to the largest measured diameter minus the smallest measured diameter divided by the average measured diameter can be used. For FIG. 9, this index varies from about 0.016 to about 0.011, with the maximum error occurring for fiber orientations of around 20°, 70°, 110°, and 160°. This error is around 30% and comprises an underestimate of the degree of non-circularity.

By assuming that the non-circularity of the fiber is purely elliptical, the error in the estimate of the degree of non-circularity can be reduced by performing an elliptical fit. However, in general, it is preferred not to assume that the non-circularity is purely elliptical, and thus the procedure of using an index of the type discussed above is preferred.

Although illustrated for the case of four detectors, it is to be understood that in general ellipticity can be characterized using three or more detectors. The configurations of the detectors logically break into two qualitatively different types: configurations using an odd number of detectors and configurations using an even number.

The odd number configurations have the advantage that the maximum underestimate of non-circularity is less than that for the next larger even number system, e.g., the underestimate for three detectors is less than that for four detectors.

Figure 10:
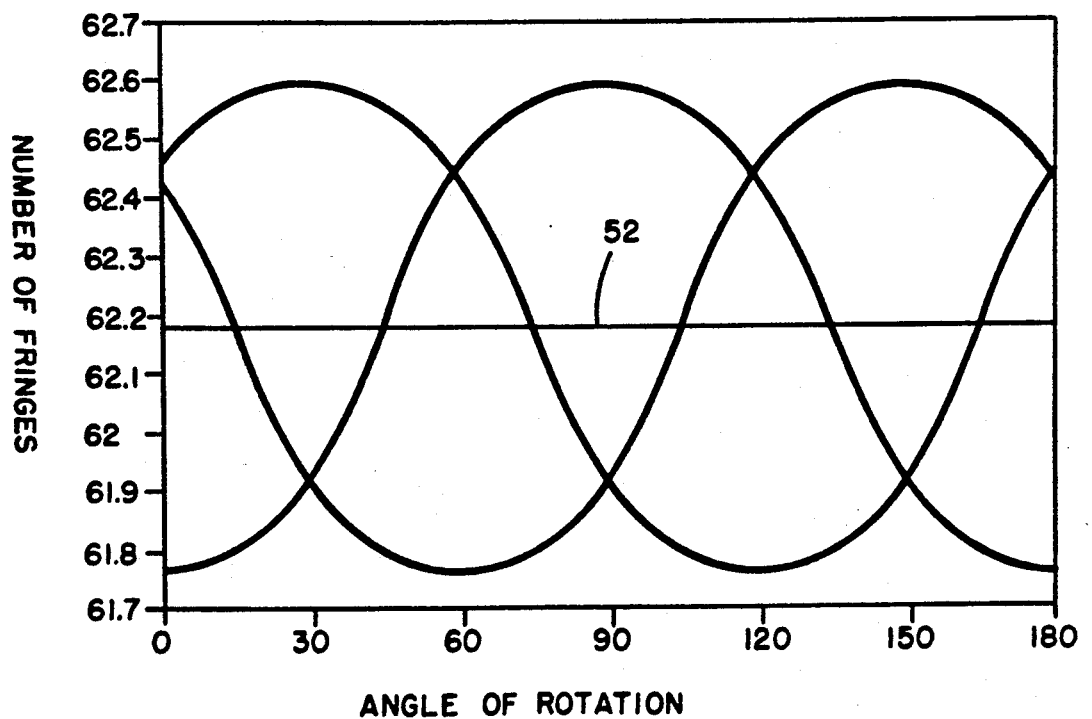
FIG. 10 is a graph of simulated fringe counts versus angle of rotation of an elliptical fiber for three detectors located 120° out of phase from one another.

This effect can be seen by comparing FIGS. 9 and 10. For fiber rotation orientations around 20°, 70°, 110°, and 160° in FIG. 9, the largest overestimate of the fibers minor axis coincides with the largest underestimate of the fibers major axis, thus yielding the maximum underestimate of the fiber's non-circularity.

For an odd number of detectors, this coincidence of greatest error for the major and minor axes does not occur. This effect is illustrated in FIG. 10 for the case of three detectors. As shown in this figure, the location at which the overestimate of the minor axis is largest corresponds to a correct estimate of the major axis and vice versa, the location at which the underestimate of the major axis is largest corresponds to a correct estimate of the minor axis. As a result, the overall maximum underestimate of the fiber's non-circularity is less for the three detector system (i.e., about 25%) than for the four detector system (i.e., about 30%). Also, the variation in the estimate of non-circularity is less for the three detector system than the four detector system, i.e., in FIG. 9 the underestimate ranges from 0% to about 30%, while in FIG. 10 the range is much narrower and goes from about 12% to about 25%.

The disadvantage of an odd number of views comes from practical problems in arranging the detectors and the lasers. For example, for a three detector system, the detectors should be placed around the fiber so that plots of fringe count versus angle of fiber rotation for the three locations are 120° out of phase (see FIG. 10). In general, if only one laser is used, this will put one of the detectors at a location where the fringe pattern is not representative of the diameter of the fiber (see the Watkins patents). Accordingly, at a minimum, one would need to use two lasers to achieve a three detector system with one laser being associated with two of the detectors and the other laser associated with the third detector. More simply, three lasers and three detectors can be used, where the laser-detector pairs are stacked on top of one another with their central axes shifted by 120°.

In general, the increased complexity of the odd number configuration makes the even number configuration preferable. In particular, using repeating units of the basic, two-view, ellipticity-insensitive system shown in FIG. 2 is considered the most preferred approach for quantifying fiber non-circularity since, among other things, it requires no changes to an existing two view, ellipticity-insensitive system to upgrade to a four or more view, non-circularity quantification system, and it provides redundancy with regard to ellipticity-insensitivity since in the event of failure within one of the basic two-view systems, any of the remaining two-view systems will yield an ellipticity-insensitive measurement of the fiber diameter.

It should be noted in FIGS. 9 and 10, that the average of the signals from the four detectors in FIG. 9 or the three detectors in FIG. 10 is insensitive to fiber ellipticity (see curves 50 and 52). More generally, ellipticity-insensitivity can be achieved by locating a plurality of detectors, i.e., "M" detectors, around a fiber such that plots of diameter versus angle of rotation for an elliptical fiber determined for the m locations are approximately 180°/M out of phase from one another. Thus, in moving from two to three or more views, one gains the ability to quantify fiber non-circularity without losing the ability to make a ellipticity-insensitive measurement of fiber diameter.

In addition to their use in generating fiber diameter measurements which are insensitive to ellipticity and in characterizing the non-circularity of fibers, the various embodiments of the invention can also be used to generate an estimate of and/or control to the maximum material condition (MMC) of the fiber during fiber draw. The MMC for a fiber can be defined as the smallest circle which circumscribes the fiber. For an ellipse, it is the major axis of the ellipse. Its relevance is to applications in which the fiber is placed within a rigid tube, e.g., a connector ferrule. The MMC can be estimated as the maximum diameter measured among the M views, or alternatively, can be estimated as the major axis of a fit ellipse. The pros and cons of these two estimate techniques are the same as the pros and cons of the related techniques for estimating fiber non-circularity discussed above.

As an example of the an estimation technique for the MMC, in FIG. 6, the MMC at any given fiber angle is the larger of curves 37 and 39. Note that, in this case, the MMC is correctly estimated only at the 45° and 90° orientations. At other fiber orientations, the MMC is underestimated, with a maximum underestimate equal to 50% of the difference of the major and minor axes occurring at the 0°, 90°, and 180° orientations. While this error is smaller than would be yielded if a single view were used to estimate the MMC, it is still relatively large compared to desired level of measurement and control. Generally, the magnitude of underestimate is reduced as the number of views is increased. As an illustration of this improvement, for the four view system shown in FIG. 9, the maximum underestimate of the MMC, occurring at the 22.5°, 67.5°, 112.5°, and 157.5° orientations, is only 29% of the difference between the major and minor axes.

Although preferred and other embodiments of the invention have been described herein, other embodiments may be perceived by those skilled in the art without departing from the scope of the invention as defined by the following claims.

What is claimed is:

1. A method for measuring the diameter of a transparent filament comprising the steps of:
   (a) directing a beam of radiation at said filament so as to produce an interference pattern;
   (b) detecting said interference pattern at a first location;
   (c) generating a first signal representative of the filament's diameter from the detected interference pattern at the first location;
   (d) detecting said interference pattern at a second location;
   (e) generating a second signal representative of the filament's diameter from the detected interference pattern at the second location; and
   (f) averaging said first and second signals to produce a third signal representative of the fibers diameter, said first and second locations being chosen so that the third signal is substantially insensitive to ellipticity of the filament.

2. The method of claim 1 wherein the first and second locations are chosen so that a plot of diameter versus angle of rotation for an elliptical filament determined for the first location is approximately 90° out of phase from the same plot determined at the second location.

3. The method of claim 1 wherein the included angle between the first and second locations is between about 120° and about 124°.

4. The method of claim 3 wherein the included angle is about 123°.

5. The method of claim 4 wherein the filament includes a cladding composed of fused silica having an index of refraction of approximately 1.457.

6. The method of claim 1 wherein the beam defines a central axis and the first and second locations are on opposite sides of and equally angularly spaced from said axis.

7. Apparatus for measuring the diameter of a transparent filament comprising:

(a) means for producing a beam of coherent, monochromatic light;
(b) means for directing said beam at the filament so as to produce an interference pattern;
(c) first means for detecting said interference pattern at a first location and for generating a first signal representative of the filament's diameter;
(d) second means for detecting said interference pattern at a second location and for generating a second signal representative of the filament's diameter; and
(e) third means for averaging said first and second signals to produce a third signal representative of the fiber's diameter, said first and second locations being chosen so that the third signal is substantially insensitive to ellipticity of the filament.

8. The apparatus of claim 7 wherein the first and second locations are chosen so that a plot of diameter versus angle of rotation for an elliptical filament determined for the first location is approximately 90° out of phase from the same plot determined at the second location.

9. The apparatus of claim 7 wherein the included angle between the first and second locations is between about 120° and about 124°.

10. The apparatus of claim 9 wherein the included angle is about 123°.

11. The apparatus of claim 7 wherein the beam defines a central axis and the first and second locations are on opposite sides of and equally angularly spaced from said axis.

12. A method for characterizing the noncircularity of a transparent filament comprising the steps of:
(a) directing one or more beams of radiation at said filament so as to produce one or more interference patterns;
(b) detecting said one or more interference patterns at three or more spatially distributed locations;
(c) generating a signal representative of the filament's diameter for each of the three or more detections of step (b); and
(d) comparing the signals produced in step (c) to produce an index indicative of the non-circularity of the filament.

13. The method of claim 12 wherein the index comprises the difference between the signal corresponding to the largest diameter minus the signal corresponding to the smallest diameter divided by the average of the signals generated in step (c).

14. Apparatus for characterizing the noncircularity of a transparent filament comprising:
(a) means for producing a first beam of coherent, monochromatic light;
(b) means for directing said first beam at the filament so as to produce a first interference pattern;
(c) first means for detecting said first interference pattern at a first location and for generating a first signal representative of the filament's diameter;
(d) second means for detecting said first interference pattern at a second location and for generating a second signal representative of the filament's diameter;
(e) means for producing a second beam of coherent, monochromatic light;
(f) means for directing said second beam at the filament so as to produce a second interference pattern;
(g) third means for detecting said second interference pattern at a third location and for generating a third signal representative of the filament's diameter;
(h) fourth means for detecting said second interference pattern at a fourth location and for generating a fourth signal representative of the filament's diameter; and
(i) means for comparing the first, second, third, and fourth signals to produce an index indicative of the non-circularity of the filament.

15. The apparatus of claim 14 wherein the index comprises the difference between the signal corresponding to the largest diameter minus the signal corresponding to the smallest diameter divided by the average of the first, second, third, and fourth signals.

16. The apparatus of claim 14 wherein:
(a) the first and second locations are chosen so that a plot of diameter versus angle of rotation for an elliptical filament determined for the first location is approximately 90° out of phase from the same plot determined at the second location; and
(b) the third and fourth locations are chosen so that a plot of diameter versus angle of rotation for an elliptical filament determined for the third location is approximately 90° out of phase from the same plot determined at the fourth location.

17. The apparatus of claim 14 wherein:
(a) the included angle between the first and second locations is between about 120° and about 124°; and
(b) the included angle between the third and fourth locations is between about 120° and about 124°.

18. The apparatus of claim 17 wherein:
(a) the included angle between the first and second locations is about 123°; and
(b) the included angle between the third and fourth locations is about 123°.

19. The apparatus of claim 14 wherein:
(a) the first beam defines a first central axis and the first and second locations are on opposite sides of and equally angularly spaced from said first axis; and
(b) the second beam defines a second central axis and the third and fourth locations are on opposite sides of and equally angularly spaced from said second axis.

20. The apparatus of claim 19 wherein the included angle between the first and second axes is about 45°.

21. A method for measuring the diameter of a transparent filament comprising the steps of:
(a) directing one or more beams of coherent, monochromatic radiation at said filament so as to produce one or more interference patterns:
(b) detecting said one or more interference patterns at a number, M, of spatially distributed locations, where M is equal to or greater than two;
(c) generating a signal representative of the filament's diameter for each of the M locations; and
(d) averaging the signals produced in step (c) to produce a signal representative of the fibers diameter, said M spatially distributed locations being chosen so that plots of diameter versus angle of rotation for an elliptical filament determined for said M locations are approximately 180°/M out of phase from one another.

22. A method for controlling the drawing of an optical waveguide fiber comprising the steps of:

(a) directing one ore beams of coherent, monochromatic radiation at said fiber so as to produce one or more interference patterns:
(b) detecting said one or more interference patterns at a number, M, of spatially distributed locations, where M is equal to or greater than two;
(c) generating M signals, one signal for each of the M locations, each signal being representative of the fiber's diameter; and
(d) generating a control signal for the drawing of the fiber from the signals generated in step (c).

23. The method of claim 22 wherein the control signal is the average of the signals produced in step (c).

24. The method of claim 22 wherein the control signal is the maximum of the signals produced in step (c).

* * * * *

UNITED STATES PATENT AND TRADEMARK OFFICE
CERTIFICATE OF CORRECTION

PATENT NO. : 5,283,628
DATED : February 1, 1994
INVENTOR(S) : Jerald B. Dotson et al.

It is certified that error appears in the above-indentified patent and that said Letters Patent is hereby corrected as shown below:

At Col. 4, line 53, change "451" to read -- 45° --.

At. Col. 11, line 19, change "1200" to read -- 120° --.

At Col. 14, line 61, change "fibers" to read -- fiber's --.

At Col. 15, line 1, change "ore" to read -- or --.

Signed and Sealed this

Sixth Day of September, 1994

Attest:

BRUCE LEHMAN

Attesting Officer

Commissioner of Patents and Trademarks